(12) United States Patent
Goto et al.

(10) Patent No.: US 8,723,127 B2
(45) Date of Patent: May 13, 2014

(54) RADIATION DETECTOR

(75) Inventors: Narito Goto, Sagamihara (JP); Mitsuru Sekiguchi, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 421 days.

(21) Appl. No.: 13/256,052

(22) PCT Filed: Feb. 23, 2010

(86) PCT No.: PCT/JP2010/052715
§ 371 (c)(1),
(2), (4) Date: Sep. 12, 2011

(87) PCT Pub. No.: WO2010/103917
PCT Pub. Date: Sep. 16, 2010

(65) Prior Publication Data
US 2012/0001282 A1    Jan. 5, 2012

(30) Foreign Application Priority Data

Mar. 13, 2009   (JP) .................................. 2009-061056

(51) Int. Cl.
*G01T 1/10* (2006.01)
*G01T 1/20* (2006.01)
(52) U.S. Cl.
CPC .................................. *G01T 1/2018* (2013.01)
USPC ..................................................... 250/361 R
(58) Field of Classification Search
CPC ..... G01T 1/2018; G21K 4/00; G21K 2004/06
USPC ............................. 250/361 R, 370.01–370.15
See application file for complete search history.

(56) References Cited

U.S. PATENT DOCUMENTS 7,053,380 B2 * 5/2006 Homma et al. ........... 250/370.11
7,315,027 B2 * 1/2008 Okada et al. ............. 250/370.11
(Continued)

FOREIGN PATENT DOCUMENTS

JP   2005-164493 A   6/2004
JP   2006-220439 A   8/2006
(Continued)

OTHER PUBLICATIONS

International Search Report dated Apr. 6, 2010 issued in International Appln. No. PCT/JP2010/052715.

*Primary Examiner* — Kiho Kim
(74) *Attorney, Agent, or Firm* — Holtz, Holtz, Goodman & Chick, PC

(57) ABSTRACT

A radiation detector of a compact size and producing almost no image defect is disclosed, comprising a first radiation-transmissive substrate, a first adhesive layer, a second radiation-transmissive substrate, a scintillator layer and an output substrate provided with a photoelectric conversion element layer which are provided sequentially in this order, wherein an arrangement region of the scintillator layer in a planar direction of the layer includes an arrangement region of the photoelectric conversion element layer in a planar direction of the layer and an arrangement region of the first substrate in a planar direction of the substrate, and the arrangement region of the first substrate includes the arrangement region of the photoelectric conversion element layer; and when the arrangement region of the scintillator layer is divided to plural areas, a coefficient of variation of filling factor is 20% or less which is defined as a standard deviation of filling factor of phosphor of the plural areas, divided by an average value of the filling factor.

20 Claims, 4 Drawing Sheets

(56) References Cited

U.S. PATENT DOCUMENTS

| | | |
|---|---|---|
| 7,351,978 B2 * | 4/2008 | Spahn ............... 250/370.11 |
| 7,468,514 B1 | 12/2008 | Suzuki et al. |
| 7,618,511 B2 | 11/2009 | Sato et al. |
| 7,812,315 B2 | 10/2010 | Suzuki et al. |
| 8,368,025 B2 * | 2/2013 | Kasai et al. ............ 250/361 R |
| 8,461,536 B2 * | 6/2013 | Goto et al. ............ 250/361 R |
| 2005/0072937 A1 | 4/2005 | Kondo et al. |
| 2006/0263521 A1 | 11/2006 | Sato et al. |
| 2008/0043915 A1 | 2/2008 | Schulz et al. |
| 2009/0084982 A1 * | 4/2009 | Kudo et al. ............ 250/484.4 |
| 2010/0102236 A1 | 4/2010 | Inoue et al. |

FOREIGN PATENT DOCUMENTS

| | | |
|---|---|---|
| JP | 2007-40733 A | 2/2007 |
| JP | 2008-51814 A | 3/2008 |
| JP | 2008/286785 A | 11/2008 |
| JP | 2008/309770 A | 12/2008 |
| WO | WO 2004-079396 A1 | 9/2004 |

* cited by examiner

RADIATION DETECTOR

This application is a U.S. National Phase Application under 35 USC 371 of International Application PCT/JP2010/052715 filed Feb. 23, 2010.

TECHNICAL FIELD

The present invention relates to a radiation detector for use in medical diagnostic apparatuses, nondestructive inspection instruments and the like.

TECHNICAL BACKGROUND

There have been broadly employed radiographic images such as X-ray images for diagnosis of the conditions of patients on the wards. Specifically, radiographic images using an intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel detector (also denoted simply as FPD). In these apparatuses, digital radiographic images are obtained directly and can be displayed on an image display apparatus such as a cathode ray tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT).

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the scintillator layer (phosphor layer) thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of X-rays to visible light. Further, a columnar crystal structure of the phosphor can readily be formed through vapor deposition and its light guide effect inhibits scattering of emitted light within the crystal, enabling an increase of the phosphor layer thickness.

There were disclosed a technique of using a reinforcing plate to achieve enhanced flatness and rigidity of a scintillator panel (as described in patent document 1), and a technique of controlling arrangement areas of the individual layers constituting a radiation detector to inhibit peeling between members forming the individual layers (as described in patent document 2).

PRIOR ART DOCUMENTS

Patent Document

Patent document 1: JP 2008-309770 A
Patent document 2: JP 2008-286785 A

SUMMARY OF THE INVENTION

Problems to be Solved

In the technique described in the patent document 1, however, it was necessary to cover a scintillator layer with such a reinforcing plate, producing problems such that the reinforcing plate became larger and a flat panel detector (hereinafter, also denoted as FPD) also became larger. Further, in the technique described in the patent document 2, there was produced a problem such that image defects were produced along with variation in temperature and such a problem was marked specifically when using a scintillator panel, while being brought into contact with an array substrate provided with a photoelectric conversion panel.

The present invention has come into being in view of the foregoing circumstances and it is an object of the present invention to provide a radiation detector of a compact size and producing almost no image defect

Means for Solving the Problem

The present invention can be achieved by any one of the following technical means 1-9.

1. A radiation detector comprising a first radiation-transmissive substrate, a first adhesive layer, a second radiation-transmissive substrate, a scintillator layer and an output substrate provided with a photoelectric conversion element layer which are provided sequentially in this order, wherein an arrangement region of the scintillator layer in a planar direction of the scintillator layer includes an arrangement region of the photoelectric conversion element layer in a planar direction of the photoelectric conversion element layer and an arrangement region of the first substrate in a planar direction of the first substrate, and the arrangement region of the first substrate includes the arrangement region of the photoelectric conversion element layer; and when the arrangement region of the scintillator layer is divided to plural areas, a coefficient of variation of filling factor is 20% or less, where the coefficient of variation of filling factor is defined as a standard deviation of filling factor of phosphor of the plural areas, divided by an average value of the filling factor.

2. The radiation detector, as described in the foregoing 1, wherein an arrangement region of the first adhesive layer in a planar direction of the first adhesive layer is included within the arrangement region of the scintillator layer in the planar direction and includes the arrangement region of the first substrate in the planar direction.

3. The radiation detector, as described in the foregoing 1 or 2, wherein a second adhesive layer and a moisture absorbing layer are provided sequentially in this order on an opposite side of the first substrate to the scintillator layer.

4. The radiation detector, as described in any one of the foregoing 1 to 3, wherein a moisture-resistant protective layer is provided between the scintillator layer and the output substrate provided with the photoelectric conversion element layer.

5. The radiation detector, as described in 1 or 2, wherein the first substrate, the first adhesive layer, the second substrate and the scintillator layer are enveloped by a moisture-resistant protective layer.

6. The radiation detector, as described in 3, wherein the first substrate, the first adhesive layer, the second substrate, the scintillator layer, the second adhesive layer and the moisture-absorbing layer are enveloped by a moisture-resistant protective layer.

7. The radiation detector, as described in any one of 1 to 6, wherein the scintillator layer is formed by a process of gas phase deposition.

8. The radiation detector, as described in any one of 1 to 7, wherein the scintillator layer comprises a cesium halide phosphor.

9. The radiation detector, as described in any one of 1 to 8, wherein the scintillator layer contains thallium as an activator.

Effect of the Invention

According to the present invention, there can be provided a compact radiation detector causing few image defects.

EMBODIMENTS OF THE INVENTION

Figure 1:
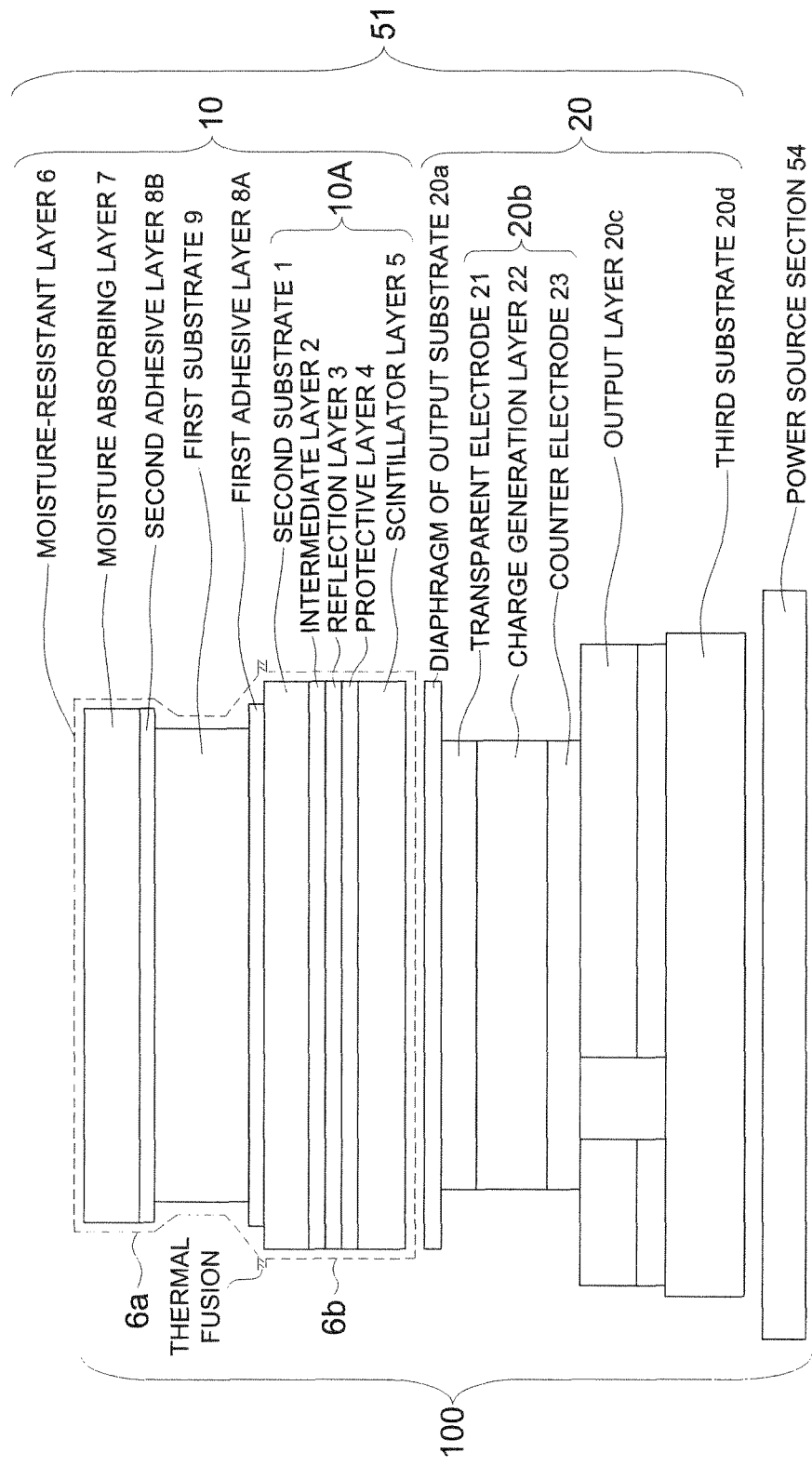
FIG. 1 is a sectional view showing a schematic constitution of a radiation detector.

In the following, there will be described the preferred embodiments of the present invention with reference to the foregoing FIGS. 1-5 but the present invention is by no means limited to these.

Scintillator Layer:

A scintillator layer (hereinafter, also denoted as a phosphor layer) is a layer emitting fluorescence upon exposure to radiation.

Namely, the scintillator refers to a phosphor emitting an electromagnetic wave with a wavelength of 300 to 800 nm, that is, an electromagnetic wave of from ultraviolet light to an infrared light, centering around visible light. In cases when using a phosphor of a columnar crystal, the column diameter of such a columnar crystal is preferably from 2.0 to 20 μm, and more preferably from 3.0 to 15 μm. The thickness of the scintillator layer 5 is preferably from 100 to 1000 μm, more preferably from 120 to 800 μm and still more preferably from 140 to 600 μm.

In the present invention, it is aimed that, when a scintillator layer is equally divided to plural regions and, a coefficient of variation of filling factor of the individual region is determined, the coefficient of variation is not more than 20%, preferably not more than 10%, and more preferably not more than 5%. The coefficient of variation of filling factor being not more than 20% achieves enhanced luminance and sharpness and it is also preferable to inhibit occurrence of image defects accompanied by temperature variation. A smaller coefficient of variation of a filling factor is more preferable, but it is usually not less than 0.1%. A coefficient of variation of filling factor of not more than 20% can be achieved by controlling an arrangement of an evaporation source 63 used in a preparation device of a scintillator layer 5. As exemplified in a preparation method of a scintillator panel shown in FIG. 3 described later, it can be achieved by disposing plural evaporation sources 63 on the circumference of a circle, and it is more preferred to dispose an evaporation source 63, that is, evaporation source 63c at the central portion of the circle. Further, it is more preferred that plural evaporation sources 63 are disposed on circumferences of plural concentric circles, as denoted by 63a and 63b. Formation of a scintillator layer by a coating method can be performed by controlling a slit shape of a coater used in coating through precision grinding.

The filling factor of the scintillator layer 5 is preferably from 70 to 90%, more preferably from 72 to 88% and still more preferably from 75 to 85%. The filling factor refers to a value of a real mass of the scintillator layer 5, divided by a theoretical density and an apparent volume. Control of the filling factor of the scintillator layer 5 can be achieved by control of a substrate temperature, an evaporation speed or an introduction amount of a carrier gas when performing evaporation. Control by a coating method can be achieved by adjusting a ratio of phosphor to binder or regulating temperature, pressure and speed in calendaring.

Scintillator Layer and Phosphor Layer:

A material to form a scintillator layer 5 may employ a variety of commonly known phosphor materials, of which cesium iodide (CsI) is specifically preferred since it exhibits an enhanced conversion rate of X-rays to visible light and readily forms a columnar crystal structure of a phosphor, whereby scattering of emitted light within the crystal is inhibited through the light guide effect, rendering it feasible to increase the scintillator layer thickness.

CsI exhibits, by itself, a relatively low emission efficiency so that various activators are incorporated. For example, JP 54-035060 B disclosed a mixture of CsI and sodium iodide (NaI) at any mixing ratio. Further, as disclosed in JP 2001-059899 A, vapor deposition of CsI containing an activator, such as indium (In), thallium (Tl), lithium (Li), potassium (K), rubidium (Ru) or sodium (Na). In the present invention, thallium (Tl) is preferred.

In the invention, it is preferred to employ an additive containing at least one thallium compound and cesium iodide, as raw materials to form a scintillator layer of Tl-containing CsI. Thus, thallium-activated cesium iodide (denoted as CsI:Tl), which exhibits a broad emission wavelength of from 400 to 750 nm, is preferred.

There can be employed various thallium compounds (compound having an oxidation number of +I or +III) as a thallium compound contained in such an additive.

Preferred examples of thallium compounds include thallium bromide (TlBr), thallium chloride (TlCl), and thallium fluoride (TlF, $TlF_3$).

The melting point of a thallium compound is preferably in the range of 400 to 700° C. in terms of emission efficiency. In the invention, the melting point is one under ordinary temperature and ordinary pressure.

The molecular weight of a thallium compound is preferably in the range of from 206 to 300.

In the scintillator layer of the present invention, the content of an additive, as described above is desirably optimized in accordance with its object or performance but is preferably from 0.01 to 20 mol % of cesium iodide, and more preferably from 0.05 to 5 mol %.

In the present invention, there are usable various materials other than the foregoing CsI:Tl.

For example, an alkali metal halide phosphor represented by the following basic composition formula (I) is cited:

$$M^I X \cdot aM^{II}X'_2 \cdot bM^{III}X''_3 : zA \qquad \text{formula (I)}$$

In the foregoing formula, $M^I$ is at least an alkali metal selected from the group consisting of Li, Na, K, Rb and Cs; $M^{II}$ is at least an alkaline earth metal or divalent metal selected from the group consisting of Be, Mg, Ca, Sr, Ba, Ni, Cu, Zn and Cd; $M^{III}$ is at least a rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each at least a halogen atom selected from the group consisting of F, Cl, Br and I; A is at least a rare earth element of metal selected from the group consisting of Y, Ce, Pr, Nd, Sm, Eu, Gd, Tb, Dy, Ho, Er, Tm, Yb, Lu, Na, Mg, Cu, Ag, Tl, and Bi; a, b and e are $0 \leq a < 0.5$, $0 \leq b < 0.5$ and $0 < z < 1$, respectively.

In the formula (I), $M^I$ preferably includes Cs, X preferably includes I, and A is preferably Tl or Na. Further, z is preferably a numerical value falling within the range of:

$$1 \times 10^{-4} \leq z \leq 0.1.$$

Further, a rare earth-activated alkaline earth metal fluorohalide phosphor represented by the following formula (II):

$$M^{II}FX:zLn \qquad \text{Formula (II)}$$

In the foregoing formula, $M^{II}$ is at least an alkaline earth metal selected from the group consisting of Ba, Sr and Ca; and Ln is at least a rare earth element selected from the group consisting of Ce, Pr, Sm, Eu, Tb, Dy, Ho, Nd, Er, Tm and Yb; X is a halogen atom selected from the group consisting of Cl, Br and I; and z is a numerical value falling within the range of $0 < Z \leq 0.2$.

At least a half of $M^{II}$ of the foregoing formula is preferably accounted for by Ba. Ln preferably is EU or Ce.

Further, there are also included LnTaO$_4$:(Nb, Gd) type, Ln$_2$SiO$_5$:Ce type, LnOX:Tm type (in which Ln is a rare earth element), Gd$_2$O$_2$S:Tb, Gd$_2$O$_2$S:Pr, Ce, ZnWo$_4$, LuAlO$_3$:Ce, Gd$_3$Ga$_5$O$_{12}$:Cr, Ce and HfO$_2$.

In the following, a layer arrangement of an imaging panel will be described with reference to FIG. 1.

In the present invention, a scintillator layer 5 is provided on a second radiation-transmissive substrate 1 through a reflection layer 3 and a protective layer 4 to form a scintillator panel 10, which is then adhered to or brought into contact with an output substrate 20c forming an output layer in which picture elements comprised of a photosensor and TFT are two-dimensionally formed on a third substrate 20d and a photoelectric conversion layer 20b, whereby a radiation detector 100 is formed; alternatively, after forming an output substrate 20c forming an output layer in which picture elements comprised of a photosensor and TFT are two-dimensionally formed on a third substrate 20d and a photoelectric conversion layer 20b, a scintillator panel 10 provided with a scintillator layer 5 through a protective layer is directly formed, whereby a radiation detector 100 is formed. However, the former system will be described in the embodiments of the present invention.

Protective Layer:

The scintillator panel 10 of the present invention preferably comprises a reflection layer 3 provided on the second substrate 1 and a protective layer 4 provided on the reflection layer 3. To achieve sufficient storage characteristics and inhibition of light scattering, the thickness of the protective layer 4 is preferably from 0.2 to 5.0 μm, more preferably from 0.5 to 4.0 μm, and still more preferably from 0.7 to 3.5 μm.

The protective layer 4 preferably employs an organic resin. Specific examples of such an organic resin include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, poly(styrene-co-butadiene), various synthetic rubber resins, phenol resin, epoxy resin, urea resin, melamine resin, phenoxy resin, silicone resin, acryl resin and urea formamide resin.

Of these, it is preferred to employ a polyurethane, polyester, vinyl chloride copolymer, poly(vinyl butyral), nitrocellulose, polyimide or poly-p-xylylene.

Usually, formation of a scintillator by vapor deposition is carried out at a substrate temperature of 150 to 250° C. and the protective layer 4 effectively functions as an adhesion layer by containing an organic resin exhibiting a glass transition temperature of −20 to 45° C. in a protective layer.

Examples of a solvent used for preparation of the protective layer 4 include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

The protective layer 4 of the invention preferably is a light-absorbing layer and its absorption peak wavelength is preferably from 560 to 650 nm. The protective layer 4 preferably contains at least one of a pigment and a dye so that the absorption peak wavelength falls within the range of 560 to 650 nm.

The protective layer 4 preferably contains a dispersing agent or the like in addition to the foregoing organic resin. A colorant having an absorption peak wavelength within the range of 560 to 650 nm may employ a commercially available one or one which is described in various literatures.

A colorant having absorption within the wavelength region of 560 to 650 nm is preferable and violet to blue, organic or inorganic colorants are preferably used.

Examples of such violet to blue, organic colorants include dioxazine (violet) and phthalocyanine blue or indanthrene blue (blue). Specific examples thereof include Zapon Fast Blue 3G (produced by Hoechst Co.), Estrol Bril Blue N-3RL (produced by Sumitomo Kagaku Co., Ltd.), Sumi Acryl Blue F-GSL (produced by Sumitomo Kagaku Co., Ltd.), Estrol Bril Blue N-3RL (produced by Sumitomo Kagaku Co., Ltd.), D&C Blue No. 1 (National Aniline Co.), Spirit Blue (produced by HODOGAYA KAGAKU Co., Ltd.), Oil Blue No. 603 (Produced by Orient Co.), Kiton Blue A (produced by Ciba Geigy Co.), Eisen Cation Blue GLH (produced by HODOGAYA KAGAKU Co., Ltd.), Lake Blue AFH (produced by KYOWA SANGYO Co., Ltd.), Primocyanine 6GX (produced by Inahata Sangyo Co., Ltd.), Brilacid Green 6BH (produced by HODOGAYA KAGAKU Co., Ltd.), Cyanibe Blue BNRS (produced by Toyo Ink Co., Ltd.) and Lyonoyl Blue SL (Produced by Toyo Ink Co., Ltd.).

Specific examples of inorganic colorants of violet-blue-bluish green include cobalt blue, celurean blue, chromium oxide and $TiO_2$—ZnO—Co—NiO type pigments.

Preferred colorants are metal phthalocyanine pigments.

Preferred examples of such a metal phthalocyanine pigment include copper phthalocyanine pigment. So far as the absorption peak wavelength falls within the range of 560 to 650 nm, there may be used phthalocyanine pigments containing other metals, such a zinc, cobalt, iron, nickel, or the like.

A suitable phthalocyanine pigment may be unsubstituted or substituted (by substituents such as an alkyl, an alkoxy, a halogen (e.g., chlorine) or other typical substituents). Crude phthalocyanine can be produced by any of the methods known in the art but preferably by allowing phthalic acid anhydride, phthalonitrile or their derivatives to react with a metal donor, a nitrogen donor (for example, urea or phthalonitrile) and optionally in the presence of a catalyst.

It can be referred to, for example, W. Herbst and K Hunger "Industrial Organic Pigment" (published by VCH publisher, New York, 1993), pages 418-427; H. Zollinger "Colorant chemistry" (VCH publisher, 1973) pages 101-104; "Phthalocyanine Pigment in N. M. Pigelow and M. A. Perkins, edited by Lubs "Chemistry of Synthetic Dye and Pigment" (published by Robert E. Krieger Publisher. 1955) pages 584-587; U.S. Pat. Nos. 4,158,572, 4,257,951 and 5,175,282; and British Patent No. 1502884.

Preferably, a pigment is dispersed in the foregoing organic resin. There can be used various dispersing agents, depending on the organic resin and the pigment used therein.

Examples of such a dispersing agent include phthalic acid, stearic acid, capronic acid and hydrophobic surfactants.

Methods for dispersing a pigment in an organic resin can employ commonly known dispersion techniques used in ink production or toner production. Examples of a dispersing machine include a sand mill, an atreiter, a pearl mill, a super-mill, a ball mill, an impeller, a disperser, a KD mill, a colloid mill, a dynatron, a three-shaft mill, and a pressure kneader. Details are described in, for example, "Saishin Ganryo Oyogijutsu (New Application Technique of Pigment)" (CMC publisher, 1986).

The protective layer 4 is formed by coating a resin dissolved in a solvent and being dried, or by a CVD process.

First Radiation-Transmissive Substrate:

A first radiation-transmissive substrate 9 related to the present invention, which is capable of transmitting radiation, can employ various kinds of glasses, polymeric material and metals. The first substrate 9 is directly or optionally provided with a functional layer such as a moisture absorptive layer 7 and is attached to a second substrate 2 through a first adhesive layer 8A, such as a double-faced adhesive tape, hot-melt sheet or adhesive) on the opposite surface side. The first substrate 9 may employ (1) cathon fiber reinforced plastics (CFRP), (2) a cathon board, in which a charcoal and paper are carbonized and solidified, (3) a carbon substrate or graphite substrate, (4) plastic substrate, (5) a glass substrate or (6) a material in which a substrate of the foregoing (1) to (5) is thinly formed and sandwiched between expanded resins. The thickness of the first substrate 9 preferably is larger than that of the second substrate 1. Thereby, the strength of the overall scintillator panel 10 is enhanced. The first substrate 9 is required to be arranged in its planar direction so that the region of the substrate 9 arranged in its planar direction includes the region of a photoelectric conversion element layer arranged in its planar direction. Thereby, a shadow of the first substrate 9 being cast thereto is prohibited, inhibiting an uneven image formation. Further, the first substrate 9 is required to be arranged in its planar direction so that the region of the substrate 9 arranged in its planar direction is included within the region of a scintillator layer 5 of the scintillator panel 10, arranged in its planar direction. Thereby, downsizing of the scintillator panel 10 becomes feasible. It is preferable that the end of the first substrate 9 is tapered or rounded (or roundness being applied) on its edge or over the whole circumference. Thereby, it becomes difficult to be broken even when being sealed.

Adhesive Layer:

An adhesive layer which is applicable to a first adhesive layer 8A and a second adhesive layer 8B related to the present invention, can employ a double coating tape (matrix tape), a hot-melt sheet and an adhesive.

Examples of a hot-melt resin used for a hot-melt sheet include a polyolefin resin, a polyester resin, a polyurethane resin, and an epoxy resin. The thermal expansion coefficient of a hot-melt resin, depending on a material, is, for example, within a range of $160-230\times10^{-6}/°C$. There is usable, for example, a hot-melt resin described in paragraphs [0024] to [004] in JP 2006-078471 A. There are also usable adhesives belonging to an acryl type, epoxy type and silicone type. The thermal expansion coefficient of an adhesive, depending on a material, is, for example, not more than $110\times10^{-6}/°C$. The region of the first adhesive layer 8A being arranged in its planar direction is included within the region of the scintillator layer 5 being arranged in its planar direction and needs to include a region of the first substrate 9 being arranged in its planar direction.

Moisture-Absorbing Layer:

A moisture-absorbing layer 7 preferably employs a resin layer containing a desiccant and, for example, Dry Keep (which is a composite product of a resin such as plastics and a desiccant) is usable.

Second Radiation-Transmissive Substrate:

A second radiation-transmissive substrate 1 related to the present invention, which is a plate-form material capable of transmitting radiation and supporting the scintillator layer 5, can employ various kinds of glasses, ceramics, polymeric material and metals.

There are usable a plate glass such as quartz, borosilicate glass, or chemically reinforced glass; a ceramic substrate such as sapphire, silicon nitride or carbon nitride; a semiconductor substrate such as silicon, germanium gallium arsenide, gallium phosphide or gallium nitride; a polymeric film (plastic film) such as cellulose acetate film, polyester film, polyethylene terephthalate film, polyethylene naphthalate film, polybutylene naphthalate film, polyamide film, polyimide film, polyether imide film, triacetate film, polycarbonate film, syndiotactic polystyrene film, polyacrylate film, polysulfone film, polyether sulfone film, or carbon fiber reinforced resin sheet; a metal sheet such as aluminum sheet and copper sheet; and a metal sheet provided with a covering layer of the foregoing metal oxide.

Specifically, a polymer film comprising a polyimide or polyethylene naphthalate is suitable for formation of a columnar scintillator by a process of gas phase deposition using cesium iodide as a raw material.

Specifically, the second substrate 1 preferably is a 50-500 μm thick, flexible polymer film Herein, the flexible film substrate refers to a substrate film exhibiting an elastic modulus at 120° C. (also denoted as E120) of 1000 to 6000 $N/mm^2$. Such a substrate preferably is a polymer film comprised of a polyimide or polyethylene terephthalate.

In the region showing a linear relationship between strain and corresponding stress which is measured by using a tensile strength tester based on JIS C 2318, the elastic modulus is calculated as the slope of the straight portion of the stress-strain curve, that is, a strain divided by a stress. It is also referred to as a Young's modulus. In the present invention, such a Young's modulus is also defined as the elastic modulus.

The second substrate 1 used in the present invention preferably exhibits an elastic modulus at 120° C. (which is also denoted simply as E120) of 1000 to 6000 N/mm$^2$, and more preferably 1200 to 5000 N/mm$^2$.

Specific examples thereof include polymer film comprised of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyether imide (E120=1900 N/mm$^2$), polyimide (E120=5000 N/mm$^2$), polyacrylate (E120=1700 N/mm$^2$), polysulfone (E120=1800 N/mm$^2$) or polyether sulfone (E120=1700 N/mm$^2$).

These may be used singly or mixedly, or laminated. Of these polymer films, a polymer film comprising polyimide or polyethylene naphthalate is preferable.

Reflection Layer:

A reflection layer 3 reflects light emitted from a scintillator of a scintillator layer 5 to achieve enhanced light-extraction efficiency. The reflection layer is preferably formed of a material containing any one of the element group of Al, Ag, Cr, Cu, Ni, Ti, Mg, Rh, Pt and Au. It is specifically preferred to use a metal thin film composed of the foregoing element, for example, Ag film or Al film Such a metal thin-film may be formed of two or more layers. In cases when a metal thin-film is formed of two or more layers, the lower layer preferably contains Cr to achieve enhanced adhesion to the second substrate 1. The lower layer of a Ni/Cr layer is specifically preferred.

A reflection layer 3 reflects emission from a scintillator layer 5 and also transmits radiation. In one preferred embodiment, the reflection layer 3 is a metallic thin-layer capable of transmitting radiation and reflecting a prescribed light (light emitted from a scintillator).

The thickness of the reflection layer 3 is preferably from 0.005 to 0.3 μm, and more preferably from 0.01 to 0.2 μm in terms of emitted light extraction efficiency.

There may be further provided with at least an oxide layer between the reflection layer 3 and the scintillator layer 5. Providing such an oxide layer results in enhanced reflectance, leading to enhanced luminance. Further, the use of aluminum or carbon for the second substrate 1 achieves prevention of corrosion. Such an oxide layer preferably comprises a metal oxide, including, for example, $SiO_2$ and $TiO_2$. Further, an oxide layer is preferably formed of plural oxide layers.

The thickness of an oxide layer is preferably from 0.005 to 0.3 μm, and more preferably from 0.01 to 0.2 μm in terms of enhancement of luminance and prevention of corrosion.

Intermediate Layer:

In the present invention, there may be provided an intermediate layer 2 between the second substrate 1 and a reflection layer 3. The intermediate layer 2 preferably is a resin-containing layer. Specific examples of such a resin include polyurethane, vinyl chloride copolymer, polyvinyl butyral copolymer, vinyl chloride/vinyl acetate copolymer, vinyl chloride/vinylidene chloride copolymer, vinyl chloride/acrylonitrile copolymer, butadiene/acrylonitrile copolymer, polyamide resin, polyvinyl acetal, polyester, cellulose derivatives (e.g., nitrocellulose), polyimide, polyamide, poly-p-xylirene, styrene/butadiene copolymer, various kinds of synthetic rubber type resins, phenol resin, epoxy resin, urea resin, melamine resin, phenoxy resin, silicone resin, acryl resin and urea-formamide resin. Of these are preferred polyurethane, polyester, vinyl chloride type copolymer, polyvinyl butyral, nitrocellulose, polyimide and poly-p-xylylene.

The thickness of the intermediate layer (2) is preferably from 1.0 to 30 μm, more preferably from 2.0 to 25 μm, and still more preferably from 5.0 to 20 μm.

Moisture-Resistant Protective Layer:

A moisture-resistance protective layer 6 mainly aims to protect a scintillator layer 5. Namely, cesium iodide (CsI) is a hygroscopic material, and absorbs moisture from the atmosphere to deliquesce so that it is a main aim to inhibit this.

Such a moisture-resistant protective layer 6 can be formed by use of various materials. For instance, it is to form a p-xylylene membrane by a CVD process. Namely, it is to form a p-xylylene layer on all of the surfaces of a scintillator 5 and the second substrate 1, whereby a moisture-resistant protective layer is formed.

The moisture-resistant protective layer 6 may be formed in such a manner that a coating solution of a moisture-resistant protective layer 6 is directly coated on the surface of a scintillator layer 5 (phosphor layer), or a previously formed moisture-resistant protective layer 6 film is adhered to or envelops the scintillator layer 5 (phosphor layer) to be shielded. In one embodiment of the present invention, as shown in FIG. 1, the whole including a scintillator plate 10 is enveloped with film of the moisture-resistant protective layer 6 to be sealed. Two sheets of sealing film (6a, 6b) are used as film of the moisture-resistant protective layer 6, the surrounding of which is thermally adhered by a hot-press.

Alternatively, a moisture-resistance protective layer (6) may be formed by depositing an inorganic substance such as SiC, $SiO_2$, SiN, $Si_3N_4$ or $Al_2O_3$ by a sputtering process.

Taking into account formability of airspace and moisture-resistance, sharpness and workability of the scintillator layer 5 (phosphor layer), the thickness of the foregoing moisture-resistant protective layer 6 is preferably not less than 12 μm and not more than 100 μm, and more preferably, not less than 20 μm and not more than 60 μm.

Further, taking into account sharpness, unevenness of radiation image, production stability and workability, the haze ratio is preferably not less than 3% and not more than 40%, and more preferably not less than 3% and not more than 10%. The haze ratio is referred to a value determined in NDH 5000W, produced by Nippon Denshoku Kogyo Co., Ltd. A necessary haze ratio is readily attained by appropriate choice of commercially available polymeric films.

Taking into account photoelectric conversion efficiency and scintillator emission wavelength, the light transmittance of the moisture-resistant protective layer 6 is preferably not less than 70% at 550 nm; however, a film with light transmittance of 99% or more is not commercially available, so that it is substantially preferred to be not less than 70% and less than 99%.

Taking into account protectiveness and deliquescence of the scintillator layer 5, the moisture permeability of the moisture-resistance protective layer 6 is preferably not more than 50 g/m$^2$·day (40° C., 90% RH, measured in accordance with JIS Z 0208) and more preferably not more than 10 g/m$^2$·day (40° C., 90% RH, measured in accordance with JIS Z 0208); however, a film of not more than 0.01 g/m$^2$·day (40° C., 90% RH) is not commercially available, so that it is substantially preferred to be not less than 0.01 g/m$^2$·day (40° C., 90% RH) and not more than 50 g/m$^2$·day (40° C., 90% RH, measured in accordance with JIS Z 0208), and it is more preferred to be not less than 0.1 g/m$^2$·day (40° C., 90% RH) and not more than 10 g/m$^2$·day (40° C., 90% RH, measured in accordance with JIS Z 0208).

Moisture-Resistant Protective Layer:

A protective film used for a moisture-resistant protective layer 6 preferably is a layered organic film and examples thereof include a multi-layered material constituted of protective layer (outermost layer)/moisture-resistant layer/thermally fusible layer (innermost layer). The individual layers may optionally be constituted of plural layers. Preferably, a scintillator plate (10A) is vacuum-sealed with the foregoing protective film.

Thermally Fusible Layer (Innermost Layer):

A thermally fusible resin film used for an innermost layer preferably employs EVA, PP, LDPE and LLDPE, and LPDE and LLDPE produced by use of a metallocene catalyst, and a film in which these films and HDPE film are mixedly used.

Moisture-Protective Layer (Intermediate Layer):

There is cited a layer including at least an inorganic film, as described in JP 6-095302 A and "Shinku Handbook" revised edition, pages 132-134 (ULVAC, Nippon Shinku Gijutsu K. K.). Examples of such an inorganic film include a metal deposition film and an evaporation film of an inorganic oxide.

Examples of an inorganic evaporation film include inorganic evaporation films described in "Hakumaku Handbook" pages 879-901 (published by Nippon Gakujutsu Shinko-kai), "Shinku Gijutsu Handbook" pages 502-509, 612 and 810 (published by Nikkan Kogyo Shinbunsha), and "Shinku Handbook" revised edition, pages 132-134 (ULVAC, Nippon Shinku Gijutsu K. K.). There are used, for example, $Cr_2O_3$, $Si_xO_y$, (in which x=1, y=1.5-2.0), $Ta_2O_3$, ZrN, SiC, TiC, PSG, $Si_3N_4$, mono-crystalline Si, amorphous Si, W, aluminum, and $Al_2O_3$. Examples of a specifically preferred metal evaporation film include an aluminum film.

A thermoplastic resin film used for a substrate of a moisture-resistant layer can employ film materials used for packaging film, such as ethylene tetrafluoroethylene copolymer (ETEE), high-density polyethylene, oriented polypropylene (OPP), polymethyl methacrylate (PMMA), biaxially oriented nylon 6, polyethylene terephthalate PET), polycarbonate (PC), polyimide, and polyethersulfone (PES).

An evaporation film can be prepared by commonly known methods, as described in "Shinku Gijutsu Handbook" and Hoso Gijutsu vol. 29, No. 8, for example, by a resistance or high-frequency induction heating method, an electron beam (EB) method, or a plasma (PCVD) method. The thickness of an evaporation film is preferably within a range of 40 to 200 nm, and more preferably 50 to 180 nm.

Protective Layer (Outermost Layer):

A thermoplastic resin film used through an evaporation film can employ film materials used for packaging film (for example, polymer film, as described in "Kinosei Hosozairyo no Shintenkai" edited by TORAY Research Center, such as low density polyethylene LDPE), high density polyethylene (HDPE), linear low density polyethylene (LLDPE), medium density polyethylene, cast polypropylene (CPP), oriented polypropylene (OPP), oriented nylon (ONy), polyethylene terephthalate (PET), cellophane, polyvinyl alcohol (PVA), oriented vinylon (OV), ethylene-vinyl acetate copolymer (EVOH) polyvinylidene chloride (PVDC), fluorine-containing olefin (fluoroolefin) polymer and fluorine-containing olefinic copolymer.

Such thermoplastic resin film may be used in a form of a multi-layered film prepared by co-extrusion with a different film or a multi-layered film prepared by lamination with varying a stretching angle. Further, it is also feasible to combine the density and molecular weight distribution of a film to achieve needed physical properties.

In cases when not using an inorganic deposition layer, a protective layer is required to have a function as a moisture-resistant layer. In that case, a thermoplastic film used in the protective layer may be a single substance or two or more films may be laminated. Examples thereof include CPP/OPP, PET/OPP/LDPE, Ny/OPP/LDPE, CPP/OPP/EVOH, Saran UB/LLDPE (in which "Saran UB" refers to biaxially stretched film made from vinylidene chloride/acrylic acid ester copolymer, resin, produced by Asahi Kasei Kogyo Co., Ltd.), K-OP/PP, K-PET/LLDPE, and K-Ny/EVA (in which "K" refers to film coated with a vinylidene chloride resin).

Production of a protective film can employ commonly known methods, including, for example, a wet lamination method, a dry lamination method, a hot-melt lamination method, an extrusion lamination method, and a heat lamination method. In cases when not using inorganic material-deposited film, similar methods are applicable and in addition to these methods, a multi-layer inflation system and co-extrusion are also applicable, depending on a material used therein.

An adhesive used for lamination can employ commonly known adhesives. Examples thereof include a thermally soluble thermo-plastic polyolefin resin adhesive such as various kinds of polyethylene resin or various kinds of polypropylene resin; a thermally fusible thermo-plastic resin adhesive such as an ethylenic copolymer resin (for example, ethylene-propylene copolymer resin, ethylene-vinyl acetate copolymer resin and ethylene-ethyl acrylate copolymer resin), ethylene-acrylic acid copolymer resin and an ionomer resin.

Typical examples of an emulsion type adhesive as an adhesive of an emulsion or latex form include emulsions of polyvinyl acetate resin, vinyl acetate-ethylene copolymer resin, a copolymer resin of vinyl acetate and acrylic acid, a copolymer resin of vinyl acetate and maleic acid ester, an acrylic acid copolymer and ethylene-acrylic acid copolymer.

Typical examples of a latex type adhesive include rubber latexes such as styrene butadiene rubber (SBR), acrylonitrile butadiene rubber (NBR) and chloroprene rubber (CR). Further, an adhesive used for dry lamination includes, for example, an isocyanate type adhesive, a urethane type adhesive and a polyester type adhesive. In addition thereto, there are also usable commonly known adhesives such as a hot-melt laminate adhesive blending paraffin wax, microcrystalline wax, ethylene-vinyl acetate copolymer resin, ethylene-ethyl acrylate copolymer resin and the like, a pressure-sensitive adhesive and a heat-sensitive adhesive.

Polyolefin resin adhesives used for an extrusion laminate include, for example, a polymeric material composed of various kinds of a polyethylene resin, polypropylene resin or polybutylene resin, a copolymer of ethylene and another olefin (α-olefin) such as a L-LDPE resin, an ionomer resin such as Surlyn (du Pont Co.,) Himilan (Mitsui Polychemical Co., Ltd.) and Admer (adhesive polymer, Mitsui Chemicals Inc.)

Recently, there haves been also used ultraviolet curing type adhesives. Specifically, an LDPE resin and an L-LDPE are preferably used which are low-cost and superior suitability for lamination. Further, a composite resin in which at least two of the foregoing resins are blended to complement defects of the individual resins, is specifically preferred. For instance, a blend of an L-LDPE resin and an LDPE resin results in enhanced spreadability and reduced neck-in, leading to an enhanced laminating speed and reduced production of pin-holes.

Figure 2:
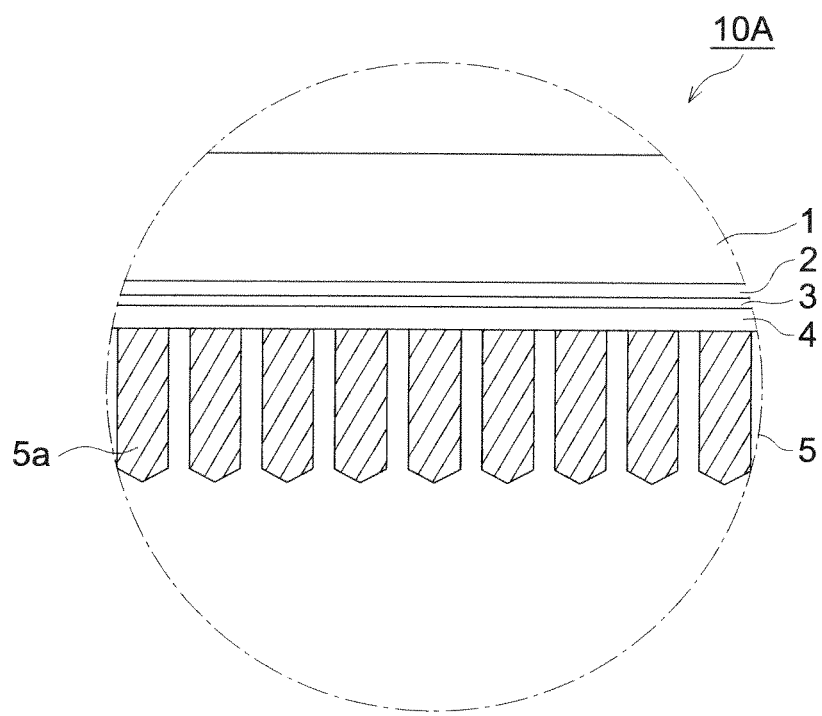
FIG. 2 is an enlarged sectional view of a part of scintillator plate 10A.
Figure 3A:
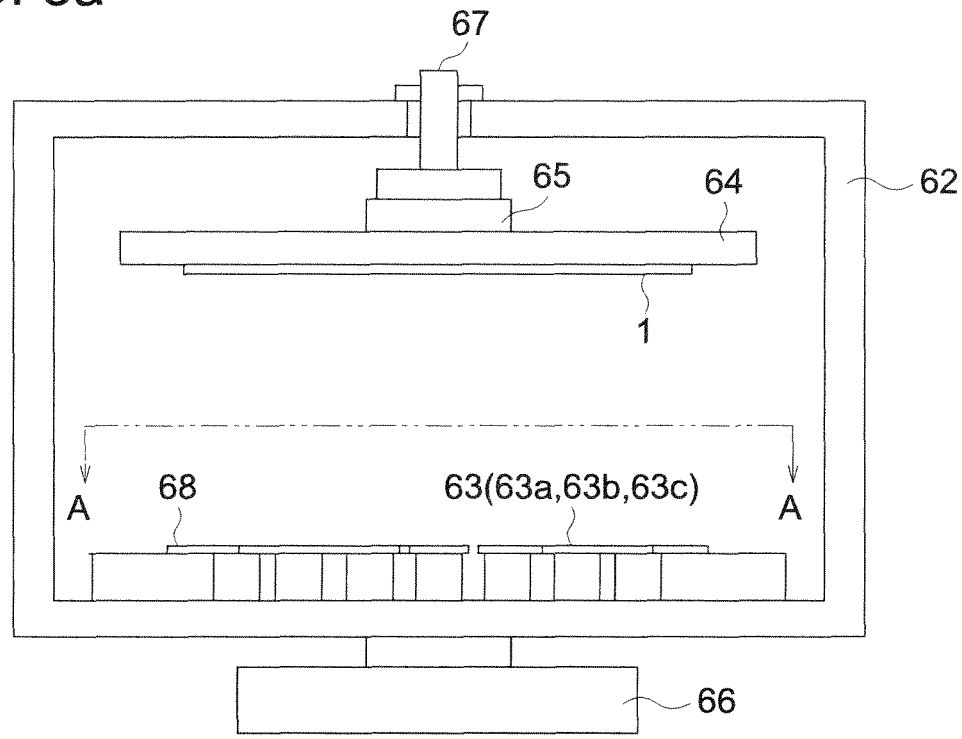
FIG. 3A is a side view showing schematic constitution of a vapor deposition device.
Figure 3B:
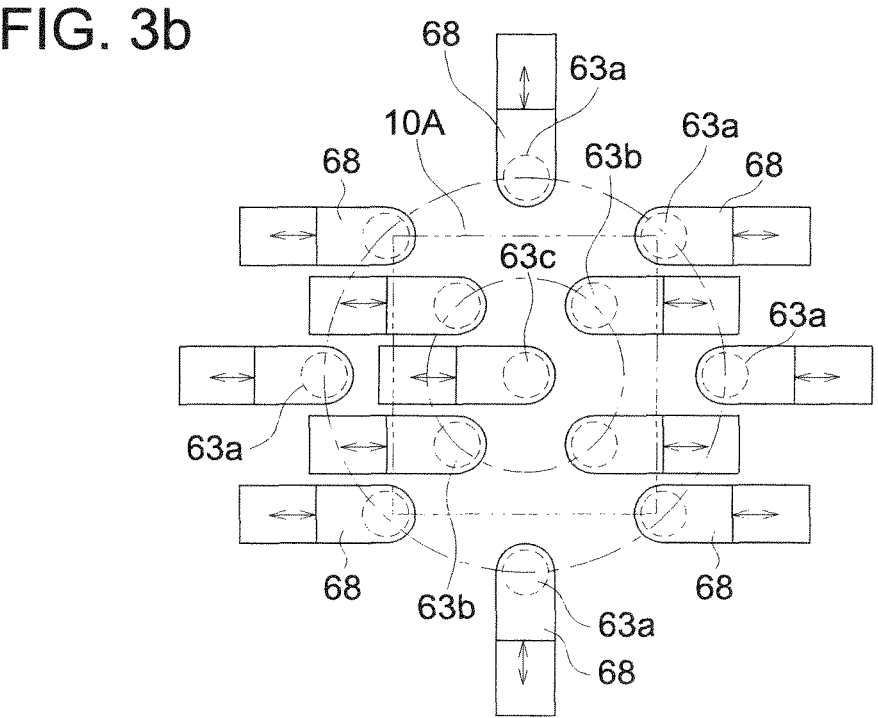
FIG. 3B is a perspective view of A-A of FIG. 3A.
Figure 5:
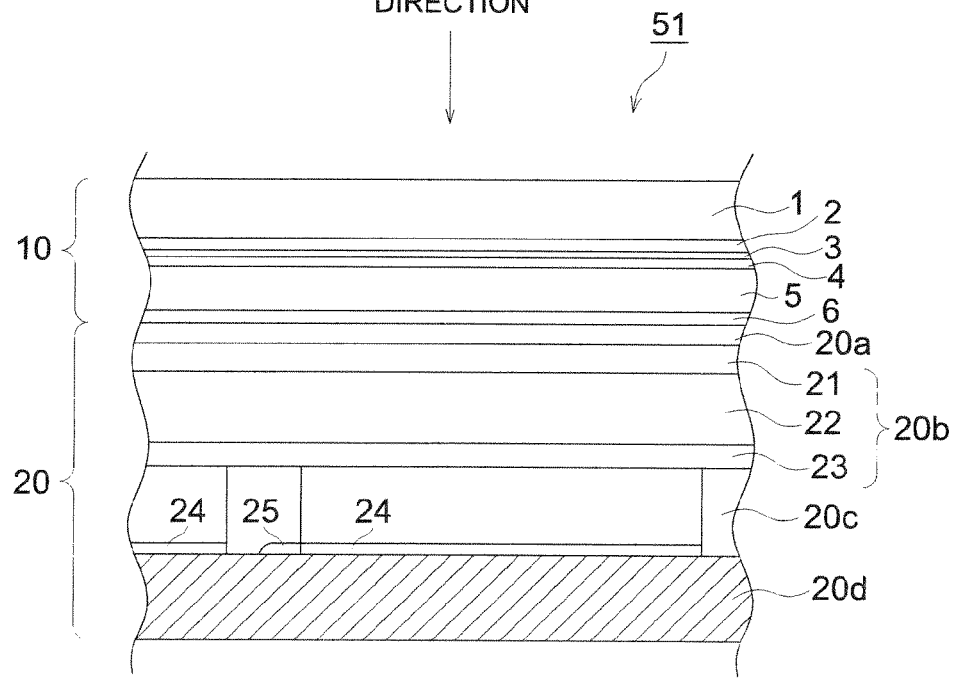
FIG. 5 illustrates an enlarged sectional view of an imaging panel (51).

Preparation Method of Scintillator Panel:

A typical example of a method of preparing the scintillator panel 10 of the present invention will be described with reference to drawings. FIG. 1 illustrates a sectional view showing a schematic layer arrangement of a radiation detector 100 installed with an imaging panel 51 constituted of a scintillator panel 10 and an output substrate 20. FIG. 2 illustrates an enlarged sectional view showing a part of a scintillator plate 10A. FIG. 3a shows a schematic constitution of a vapor deposition device 61 to form a scintillator layer by vapor deposition and FIG. 3b is a perspective view from A-A of FIG. 3a, and FIG. 5 shows enlarged layer constitution of the imaging panel 51.

Vapor Deposition Device:

In the following, a vapor deposition device is described with reference to FIG. 3. As shown in FIG. 3, a vapor deposition device for a scintillator panel is provided with a vacuum vessel 62. The vacuum vessel 62 is provided with a vacuum pump 66 to evacuate the inside of the vacuum vessel 62 and to introduce atmosphere.

A holder to support a second substrate (1) is provided near the upper surface within the vacuum vessel 62.

The second substrate 1 can optionally be chosen from material known as a substrate of a scintillator panel 10, but in the embodiments of the invention, the substrate 1 is preferably a quartz glass sheet, a metal sheet selected from aluminum, iron, tin and chromium or a carbon fiber reinforced sheet.

The second substrate 1 may be provided with a resin layer to smoothen the surface. The resin layer preferably contains a polyimide, polyethylene terephthalate, paraffin, or graphite and the thickness preferably is approximately 5 to 50 μm. The resin layer may be provided on the surface of the second substrate (1) or the back face thereof. Means to provide a resin layer on the surface of the second substrate 1 include, for example, an adhesion method, coating method or the like. Of these, the adhesion method is carried out by using a heated pressure roller, preferably under the heating condition of approximately 80 to 150° C. and the pressure condition of $4.90 \times 10$ to $2.94 \times 10^2$ N/cm at a conveyance rate of 0.1 to 2.0 m/s.

A phosphor layer is formed on the surface of the second substrate 1 by a process of gas phase deposition. The process of gas phase deposition may employ a vapor deposition method, a sputtering method, a CVD method, an ion-plating method or the like, of which the vapor deposition method is preferred in the invention.

A substrate holder 64 supports the second substrate 1 so that the substrate surface to form the phosphor layer 5 (phosphor layer) is opposed to the bottom surface of the vacuum vessel 62 and is also parallel to the bottom surface of the vacuum vessel 62.

The substrate holder 64 is preferably provided with a heater (which is not shown in the drawing) to heat the second substrate 1. Heating the second substrate 1 by the heater achieves enhanced contact of the second substrate 2 to the substrate holder 64 and controls layer quality of the phosphor layer. Further, adsorbate on the surface of the second substrate 1 is also eliminated or removed to inhibit generation of an impurity layer between the surface of the second substrate 1 and a phosphor, as described later.

Further, there may be provided, as a heating means, a mechanism (not shown in the drawing) to circulate a warming medium or heating medium. Such a means is suitable when performing vapor deposition with maintaining the second substrate 1 at a relatively low temperature of 50 to 150° C.

There may be provided a halogen lamp (not shown in the drawing) as a heating means. This means is suitable when performing vapor deposition with maintaining the second substrate 1 at a relatively high temperature of not less than 150° C.

The substrate holder 64 is provided with a rotation mechanism 65 to rotate the second substrate 1 in the horizontal direction. The rotation mechanism 65 is constituted of a support rotation shaft 67 to rotating the second substrate 1 with supporting the holder 64 and a motor (not shown in the drawing) which is disposed outside the vacuum vessel and is a driving source of the substrate rotation shaft 67.

In the vicinity of the bottom surface within the vacuum vessel 62, evaporation sources 63a and 63b are disposed at positions opposed to each other on the circumference of plural (herein, two) circles centered on a center line vertical to the second substrate 1. In that case, the distance between the second substrate 1 and the evaporation source 63a or 63b is preferably from 100 to 1500 mm, and more preferably from 200 to 1000 mm. Further, the distance the center line vertical to the second substrate (1) and the evaporation source 63a or 63b is preferably from 100 to 1500 mm, and more preferably from 200 to 1000 mm.

As set forth above, an evaporation source disposed on the specific position is designated by a numeral, but an evaporation source which is not specified with respect setting position or an overall evaporation source including the foregoing 63a and 63b is designated by an evaporation source 63.

The production apparatus of the scintillator panel 10 may be provided with three or more evaporation sources 63 on the same circumference, in which the individual evaporation sources 63 may be disposed at equivalent intervals or different intervals. The radius of a circle centered on a center line vertical to the second substrate 1 can arbitrarily be set. In the present invention, plural evaporation sources 63a and 63b are disposed on the circumferences of two circles and it is preferred to dispose an evaporation source 63c also on the central portion of the circle. Disposing an evaporation source 63c on the central portion of the circle enables to achieve 20% or less of a coefficient of variation of filling factor of a phosphor of a scintillator layer 5, even when used for a large size panel such as FDP, leading to enhanced shock resistance and moisture resistance. In the present invention, plural evaporation sources 63a and 63b are preferably disposed on the circumferences of two concentric circles and preferably, plural evaporation sources (63) are concentrically disposed. When plural evaporation sources (63) are disposed on plural concentric circles, the number of peaks in a columnar diameter profile curve or an activator concentration profile of the scintillator layer 5 becomes two or more even when using a large size panel such as FPD or the like and thereby, a coefficient of variation of filling factor of a phosphor of a scintillator layer (5) becomes 20% or less, leading to enhanced shock resistance and moisture resistance.

The evaporation sources 63a, 63b and 63c which house a phosphor and heat the phosphor by a resistance heating method, may be constituted of an alumina crucible wound by a heater, a boat or a heater of a metal with a high melting point. Methods of heating a phosphor include heating by an electron beam and high-frequency induction heating, but in the present invention, a method of resistance-heating by direct current or a method of resistance-heating a crucible indirectly by a circumferential heater is preferable in terms of ease of operation by a relatively simple constitution and low price and also being applicable to many substances. The evaporation sources 63a 63b and 63c may be a molecular beam source by a molecular source epitaxial method.

A shutter 68 which is openable in the horizontal direction, as designated by the arrow, is provided between the evaporation source 63a, 63b or 63c and the second substrate 1 to intercept the space from the evaporation source 63a, 63b or 63c to the second substrate 1; this shutter prevents substances except the objective material which were attached to the phosphor surface and have been evaporated at the initial stage of vapor deposition from adhering onto the second substrate 1.

Next, there will be described a production method of a scintillator panel of the present invention by using the foregoing device 61 for vapor deposition onto a scintillator panel.

First, the second substrate 1 is placed onto the substrate holder 64. Further, evaporation sources 63a and 63b are disposed on the circumference of a circle centered on a center line vertical to the second substrate 1. In that case, the space between the second substrate 1 and the evaporation source 63a 63b or 63c is preferably from 100 to 1500 mm, and more preferably from 200 to 1000 mm. The space between the center line vertical to the second substrate 1 and the evaporation source 63a 63b or 63c is preferably from 100 to 1500 mm, and more preferably from 200 to 1000 mm.

Subsequently, the inside of the vacuum vessel 62 is evacuated to a vacuum atmosphere of 0.1 Pa or less (vacuum atmosphere forming step). The vacuum atmosphere refers to a pressure atmosphere of not more than 100 Pa and a pressure atmosphere of not more than 0.1 Pa is suitable.

Then, inert gas such as argon is introduced into vacuum vessel 62 and the interior of the vacuum vessel 62 is maintained under a vacuum atmosphere of 0.001 to 5 Pa. Thereafter, the holder (64) is rotated to the evaporation sources 63a and 63b by the rotation mechanism 65. When the vacuum vessel 62 reaches a vacuum degree capable of performing vapor deposition, phosphor is evaporated from the heated evaporation sources 63a, 63b and 63c, whereby the phosphor is grown to a desired thickness on the surface of the second substrate 1.

The process of growing a phosphor on the surface of the second substrate 1 may be divided to plural steps to form a scintillator layer 5 (phosphor layer).

In the vapor deposition method, a material subject to deposition (the second substrate 1, protective layer 4 or intermediate layer 2) may appropriately be heated or cooled during vapor deposition.

After completing vapor deposition, the scintillator layer 5 (phosphor layer) may be subjected to a heating treatment. There may be also conducted a reactive deposition in which deposition is performed, while introducing gas such as $O_2$ or $H_2$.

The temperature of the second substrate 1 on which a scintillator layer 5 (phosphor layer) is formed is preferably set to a temperature of room temperature to 300° C., and more preferably 50 to 250° C.

After forming the scintillator layer 5 (phosphor layer), a moisture-resistant protective layer 6 to physically or chemically protect the scintillator layer 5 (phosphor layer) may be provided on the phosphor layer opposite to the second substrate 1. A coating solution for a moisture-resistant protective layer 6 may be directly coated onto the surface of the scintillator layer 5 (phosphor layer) or a moisture-resistant protective layer 6 which was previously formed may be adhered to or encloses the scintillator layer 5.

Alternatively, a moisture-resistant protective layer 6 may be formed by depositing SiC, $SiO_2$, SiN or $Al_2O_3$ through a vapor deposition method, sputtering method or the like.

In the vapor deposition device 61 for a scintillator panel or the production method of the scintillator layer 5 (phosphor layer), plural evaporation sources 63a, 63b and 63c are provided, whereby the overlapping portion of vapor streams from evaporation sources 63a, 63b and 63c are straightened, resulting in uniform crystallinity of a phosphor deposited on the surface of the second substrate 1. In that case, more evaporation sources are provided, vapor streams are straightened at a larger number of portions, resulting in uniform crystallinity over a broader region. Further, when evaporation sources 63a and 63b are disposed on the circumference of a circle centered on a center line vertical to the second substrate 1, such an action of unifomalizing crystallinity by straightening vapor streams can be isotropically achieved on the surface of the second substrate 1.

Further, performing deposition of a phosphor with rotating the second substrate 1 by the rotation mechanism 65 can achieve uniform deposition of the phosphor on the surface of the second substrate 1.

Scintillator Panel:

Next, there will be described a method of preparing a scintillator panel 10.

In the preparation method of the scintillator panel 10, the above-described vapor deposition device 61 can be appropriately usable. There will be described a method of preparing the radiation scintillator 10 by use of the vapor deposition device 61.

Formation of Intermediate Layer:

An intermediate layer 2 can be formed on one side of the second substrate 2 by extrusion coating. There may optionally be added a matting agent or a filler to control the surface property or Young modulus of the intermediate layer.

Formation of Reflection Layer:

A reflection layer 3 of a thin metal layer (Al layer, Ag layer, or the like) is formed on the surface of the second substrate 2 provided with the intermediate layer 2. Films in which such Al membrane is deposited on a polymer film by sputtering, are commercially available and these are also usable.

Formation of Protective Layer:

A protective layer 4 is formed by coating the composition of a colorant and an organic resin, dispersed/dissolved in an organic solvent.

Formation of Scintillator Layer:

First, the second substrate 1 which was provided with the intermediate layer 2, the reflection layer 3 and the protective layer 4 is placed onto the holder 64, and a powdery mixture of cesium iodide and thallium iodide are filled in the evaporation source 63. The spacing between the evaporation source 63 and the second substrate 1 set to be within the range of 100 to 1500 mm and it is preferred to perform the vapor deposition process described later, while maintaining the set value falling within foregoing range.

After completing processing of the preliminary stage, a vacuum pump 66 is operated to evacuate the interior of the vacuum vessel 62 to form a vacuum atmosphere of not more than 0.1 Pa in the interior of the vacuum vessel (vacuum atmosphere forming step). Herein, the vacuum atmosphere represents an atmosphere under a pressure of not more than 100 Pa, and an atmosphere under a pressure of not more than 0.1 Pa is suitable.

Thereafter, inert gas such as argon or the like is introduced into the vacuum vessel 62 and the interior of the vacuum vessel 62 is maintained under a vacuum atmosphere of 0.1 Pa to 5 Pa. Thereafter, the heater of the substrate holder 64 and the rotation mechanism 65 are driven and the second substrate 1 placed onto the holder 64 is rotated, while being opposed to the evaporation source and heated.

In such a state, an electric current is flown from an electrode to the evaporation source 63 and a mixture including cesium iodide and thallium iodide is heated to a temperature of 700 to 800° C. over a prescribed time to evaporate the mixture.

As a result, a large number of columnar crystals 5a sequentially grow on the surface of the second substrate to form a scintillator layer 5 with an intended thickness (vapor deposition step). Thereby, a scintillator plate 10A as a constituent element of the scintillator plate 10 of the present invention can be produced.

The temperature to heat the evaporation source 63 is preferably from 500 to 800° C., and more preferably from 630 to 750° C. The temperature of the second substrate 1 is preferably from 100 to 250° C., and more preferably from 150 to 250° C. A temperature of the second substrate 1 falling within this range leads to formation of columnar crystals with a excellent form, leading to a enhanced luminance characteristic.

Formation of Moisture-Resistant Protective Layer:

A moisture-resistant protective layer 6 is formed preferably by coating, on the scintillator layer 5, a composition of an organic resin dispersed/dissolved in an organic solvent on a scintillator layer, followed by being dried. The composition may contain a colorant or a matting agent. The scintillator layer may be sealed with a sealing film which is formed by coating a composition dispersing/dissolving an organic resin on a support (PET, PEN, aramid or the like).

Figure 4:
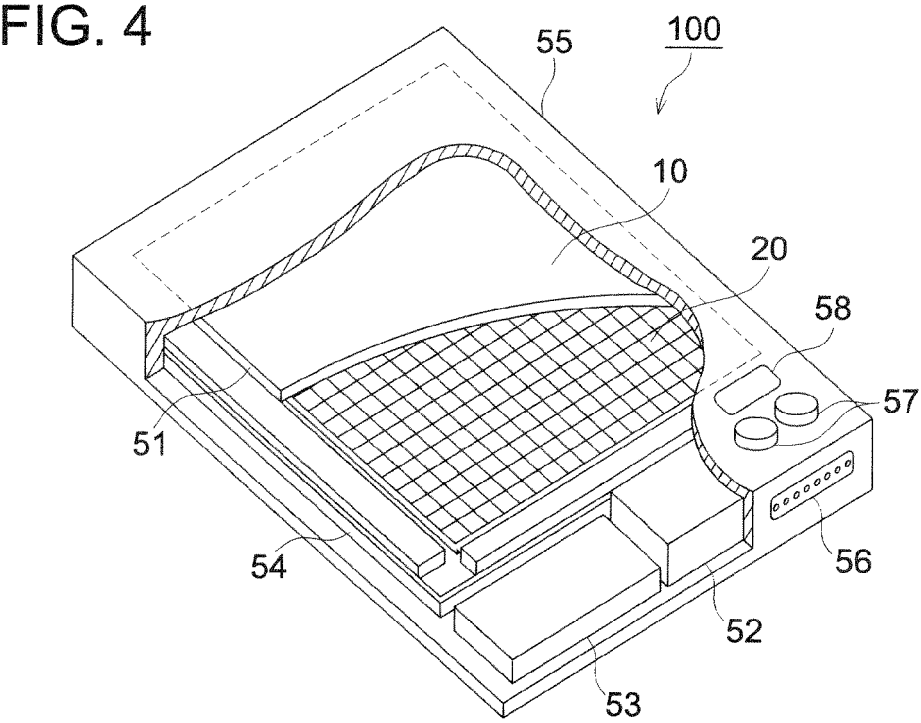
FIG. 4 illustrates a partially fractured perspective view showing a constitution of a radiation detector (100).

Radiation Detector:

In the following, there will be described constitution of a radiation detector 100 provided with the scintillator plate 10 as an application example of the radiation scintillator 10 with reference to FIGS. 4 and 5. FIG. 4 illustrates a partially fractured perspective view showing a constitution of a radiation detector 100. FIG. 5 illustrates an enlarged sectional view of an imaging panel 51.

In the radiation detector 100, as shown in FIG. 4, an imaging panel 51, a control section 52 to control movement of the radiation image detector 100, a memory section 53 to memorize image signals outputted from the imaging panel 51 by using rewritable dedicated memory (e.g., flash memory), and a power source section 54 of a power supplier to supply a power necessary to obtain image signals by driving the imaging panel 51 are provided in the interior of a housing 55. The housing 55 is provided with a connector 56 for communication to communicate from the radiation image detector 100 to the exterior if needed, an operation section 57 to change motion of the radiation image detector 100, a display section 58 to show completion of preparation for picture-taking or writing-in of an prescribed amount of image signals to a memory section 53, and the like.

Herein, if the radiation detector 100 is provided with the memory section 53 to memorize image signals of a radiation image together with the power source section 54 and is designated to be detachable through the connector 56, the radiation detector 100 can become a portable structure.

As shown in FIG. 5, an imaging panel 51 is constituted of a radiation scintillator 10 and an output substrate 20 to absorb electromagnetic waves from the radiation scintillator 10 and output image signals.

The radiation scintillator 10 is arranged on the side of the radiation-exposed surface and is constituted so as to emit an electromagnetic wave in accordance with the intensity of incident radiation.

An output substrate 20 is provided on the opposite surface of the radiation-exposed surface of the radiation scintillator 10, and a diaphragm 20a, a photoelectric conversion element 20b, an image signal output layer 20c and the substrate 20d are sequentially provided from the side of the radiation scintillator 10.

The diaphragm 20a is provided to separate the radiation scintillator 10 from other layers.

The photoelectric conversion element 20b is constituted of a transparent electrode 21, a charge generation layer 22 which generates a charge upon excitation by electromagnetic waves transmitted through the transparent electrode 21 and a counter electrode 23 opposed to the transparent electrode 21; and the transparent electrode 21, the charge generation layer 22 and the counter electrode 23 are sequentially arranged from the diaphragm 20a side.

The transparent electrode 21 is an electrode capable of transmitting electromagnetic waves to be photoelectrically converted and is formed by using, for example, an electrically conductive transparent material such as indium tin oxide (ITO), $SnO_2$ or ZnO.

The charge generation layer 22 is formed in a thin layer form on one surface side of the transparent electrode 21 and contains an organic compound capable of performing charge separation through light, as a photoelectric-convertible compound, and containing an electron donor capable of generating a charge and an electrically conductive compound as an electron acceptor, respectively. In the charge generation layer 22, the electron donor is excited upon incidence of an electromagnetic wave and releases an electron, and the released electron is transferred to the electron acceptor so that a charge, that is, carriers of a hole and an electron are generated in the charge generation layer.

Electrically conductive compounds as an electron donor include a p-type conductive polymer compound. A p-type conductive polymer compound preferably is a compound having a basic backbone of polyphenylene-vinylene, polythiophene, poly(thiophenevinylene), polyacetylene, polypyrrole, polyfluorene, poly(p-phenylene) or polyaniline.

Electrically conductive compounds as an electron acceptor include an n-type conductive polymer compound. An n-type conductive polymer compound preferably is a compound having a basic backbone of polypyridine, and more preferably a backbone of poly(p-pyridylvinylene).

The thickness of the charge generation layer 22 is preferably not less than 10 nm (and more preferably, not less than 100 nm) to secure a light absorption amount, and is preferably not more than 1 μm (and more preferably, not more than 300 nm) from the point of view that electrical resistance is not excessively large.

The counter electrode 23 is arranged on the opposite side of the side of the surface where electromagnetic waves of the charge generation layer 22 enter. The counter electrode 23 may employ by selecting one from conventional metal electrode such as gold, silver, aluminum and chromium, and the transparent electrode 21; however, to achieve superior characteristics, it is preferred to employ, as an electrode material, one of a metal, alloy, and electrically conductive compound which are low in work function (4.5 eV or less), and their mixture.

Between the respective electrodes sandwiching the charge generation layer 22 (that is, transparent electrode 21 and counter electrode 23) there may be provided a buffer layer which acts as a buffer zone so that the charge generation layer 22 is not reacted with these electrodes. The buffer layer is formed by use of, for example, lithium fluoride, poly(3,4-ethylenedioxythiophene:poly(4-styrenesulfonate), or 2,9-dimethyl-4,7-diphenyl[1,10]phenathroline.

The image signal output layer 20c accumulates a charge obtained in the photoelectric conversion element 20b and outputs signals based on the accumulated charge and is constituted of a condenser 24 as a charge accumulating device to accumulate a charge produced in the photoelectric conversion element 20b for the respective picture elements and a transistor 25 as an image signal output element to output the accumulated charge as a signal.

The transistor 25 uses, for example, TFT (Thin Film Transistor). The TFT may be one employing an inorganic semiconductor which is employed in a liquid crystal display or one employing an organic semiconductor, and preferably a TFT formed on plastic film There is known amorphous silicon as a TFT formed on plastic film. Further, TFT may be formed on a flexible plastic film by FSA (Fluidic Self Assembly) technique, that is, by arraying minute CMOS (Nanoblocks) made of a single crystal silicon on an embossed plastic film. It may be a TFT by use of an organic semiconductor, as described in the relevant literature, Science, 283, 822 (1999); Appl. Phys. Lett. 771488 (1998); and Nature, 403, 521 (2000).

The transistor 25 preferably is a TFT prepared by the foregoing FSA technique or a TFT by use of an organic semiconductor and the TFT by use of an organic semiconductor is specifically preferred. When constituting a TFT by use of such an organic semiconductor, installations such as a vacuum deposition device which is used in preparation of TFT by use of silicon are not required and a TFT can be formed by utilizing a printing technique or an ink jet technique, leading to reduction of production cost. Further, a lowering of processing temperature renders it feasible to form a TFT on a heat-sensitive plastic substrate.

The transistor 25 accumulates an electric charge generated in the photoelectric conversion element layer 20b and is also connected to a collection electrode (not shown in the drawing) as one electrode of the condenser 24. Electric charge produced in the condenser 24 is accumulated in the condenser 24 and the accumulated charge is read by driving the transistor 25. Namely, driving the transistor 25 can allow a signal for each pixel to be outputted.

The third substrate 20d functions as a support of the imaging panel 51 and can be constituted of the same material as the second substrate 1.

Next, there will be described action of a radiation detector 100.

First, radiation which has entered the radiation detector 100 enters from the scintillator panel 10 side toward the third substrate 20d side.

When radiation has entered the scintillator panel 10, a scintillator layer 5 of the scintillator panel 10 absorbs the radiation energy, and emits electromagnetic waves corresponding to its intensity. Of emitted electromagnetic waves, electromagnetic waves which have entered the output substrate 20 penetrate the diaphragm (20a) and the transparent electrode 21 and reach the charge generation layer 22. Then, the electromagnetic waves are absorbed in the charge generation layer 22 and form pairs of positive hole and electron (charge separation state) in response to its intensity.

Then, positive holes and electrons are respectively conveyed to different electrodes (transparent electrode membrane and conductive layer) through an internal electric field produced by application of a bias voltage by a power source section 54, so that a photoelectric current flows.

Thereafter, positive holes conveyed to the counter electrode 23 side are accumulated in the condenser 24. The accumulated positive holes output image signals by driving the transistor 25 connected to the condenser 24 and the outputted image signals are stored in the memory section 53.

EXAMPLES

The present invention will be further described with reference to examples but the invention is by no means limited to these.

Example 1

Preparation of Reflection Layer:

An adhesion layer of Ni/Cr layer was formed on a 125 μm thick polyimide film (UPILEX-125S, made by Ube Kosan Co., Ltd.), as the second substrate (1), and aluminum was sputtered onto the substrate to form a (0.02 μm thick) reflection layer (3). Thereafter, a (0.08 μm thick) $SiO_2$ layer and a (0.05 μm thick) $TiO_2$ layer were further formed.

Preparation of Protective Layer:

| | |
|---|---|
| Vyron 200 (made by TOYOBO Co., Ltd., polyester resin, Tg: 67° C.) | 100 parts by mass |
| Hexamethylene diisocyanates | 3 parts by mass |
| Phthalocyanine Blue | 0.1 part by mass |
| Methyl ethyl ketone (MEK) | 100 parts by mass |
| Toluene | 100 parts by mass |

The foregoing composition was mixed and dispersed by a bead mill over 15 hours to obtain a coating solution for a protective layer 4.

The coating solution was coated by an extrusion coater on the surface of the reflection layer 3 of the second substrate 1 so that the dry thickness was 2.5 μm.

Formation of Scintillator Layer:

The foregoing second substrate 1 provided with the reflection layer 3 and the protective layer 4 was placed on a substrate holder 64 installed with the substrate rotation mechanism 65. Subsequently, a phosphor raw material (CsI:0.8 mol % Tl), as an evaporation material, was placed in evaporation source crucibles 63a and eight evaporation source crucibles 63a were arranged near the bottom surface within the vacuum vessel 62 and on the circumference of a circle centered on a center line vertical to the support within the vacuum vessel 62. Herein, the distance between the second substrate 1 and each of the evaporation sources 63a was adjusted to 400 mm and the distance between the center line vertical to the second substrate 1 and each of the evaporation sources 63a was adjusted to 300 mm. Subsequently, four evaporation source crucibles 63b were arranged near the bottom surface within the vacuum vessel 62 and on the circumference of a circle centered on a center line vertical to the second substrate 1. Herein, the distance between the second substrate 1 and each of the evaporation sources 63b was adjusted to 400 mm and the distance between the center line vertical to the second substrate 1 and each of the evaporation sources 63b was adjusted to 150 mm. Further, one evaporation source crucible 63c was disposed near the bottom within the vacuum vessel 62 and on the center of a circle centered on a center line vertical to the second substrate 1. In each of these evaporation source crucibles 63a, 63b, 63c was disposed the shutter 68 which was openable in direction indicated by the arrow, as shown in FIG. 3B.

Subsequently, the interior of the vacuum vessel 62 was evacuated and then, Ar gas was introduced and adjusted to a vacuum degree of 0.02 Pa, thereafter, the temperature of the second substrate 1 was maintained at 50° C., while rotating the second substrate 1 at a rate of 10 rpm. Subsequently, the interior of the crucible was heated to a prescribed temperature by resistance heating to initiate evaporation of a phosphor and then, the temperature of the second substrate 1 was raised to 200° C. to perform vapor deposition and when the thickness of a scintillator layer (CsI:0.8 Tl mol %) layer reached 470 μm, vapor deposition was terminated The shutter 68 closed each of the crucibles at the extremely initial stage of evaporation to prevent evaporation of initial impurities from reaching the second substrate 1 and thereafter, the shutter was opened until completion of vapor deposition.

Preparation of Scintillator Panel:

The scintillator plate 10A which completed vapor deposition to form a scintillator layer was cut to a square form of 430.0 mm×430.0 mm. Further thereto, a glass substrate (429.0 mm×429.0 mm, 0.5 mm thickness, each corner being rounded), as the first substrate 9, was adhered by using a first hot-melt sheet (429.5 mm×429.5 mm, 0.5 mm thickness, and using HIRODINE 7544, produced by HIRODINE Corp.), as the first adhesive layer 8A. Thereafter, the moisture-absorbing layer 7 (DRY KEEP, 429.5 mm×429.5 mm, 80 μm thickness) was adhered to the glass substrate by using a matrix tape (100 μm thickness) as the second adhesive layer B. Then, the whole including the scintillator plate 10A was sealed with a film as a moisture-resistant protective layer 6, as shown in FIG. 1. The film of the moisture-resistant protective layer 6 employed two film sheets 6a and 6b, the circumference of which was hot-pressed and thermally fused to be sealed. The sealing film 6a used in the X-ray exposure side of the scintillator panel 10 employed a laminated film of a PET film (25 μm) as a protective layer, an aluminum foil (9 μm) as a moisture-resistant layer and a casting polypropylene or CPP film (40 μm) as a heat-fusible layer. In the X-ray exposure side of the scintillator panel 10 was used a sealing film 6b, in which two sheets of PET film (12 μm) having a vapor-deposited $Al_2O_3/SiO_2/Al_2O_3/SiO_2$ layer were dry-laminated and further thereto a heat-fusible layer of a casting polypropylene or CPP film (20 μm) as a heat-fusible layer was dry-laminated. The sealing films 6a and 6b were each used so that the surface of the CPP film faced to the scintillator panel 10.

Apparatus 101:

The foregoing scintillator panel 10 was set to Pax Scan 2520 (FPD, made by Varian Inc.), as shown in the perspective view of FIG. 4, to prepare the radiation detector 101 (hereinafter, also denoted simply as the detector 101) and evaluation was made with respect to shock resistance, sharpness, luminance and adhesiveness in the manner described below, provided that the arrangement region of a photoelectric conversion element layer was a square form and controlled so as to have an area, as shown in Table 1.

Further, there were prepared radiation detectors 102-110, (hereinafter, also denoted simply as apparatuses 102-110).

Apparatuses 102-103:

Apparatuses 102 and 103 were prepared in the same manner as the apparatus 101, except that the thickness of the scintillator layer 5 was varied, as shown in Table 1.

Apparatus 104:

Apparatus 104 was prepared in the same manner as the apparatus 101, except that there were not used four evaporation source crucibles (63b) which were arranged on the circumference at a distance of 150 mm between the center line vertical to the second substrate (1) and the evaporation source (63).

Apparatus 105:

Apparatus 105 was prepared in the same manner as the apparatus 101, except that there were not used four evaporation source crucibles (63b) which were arranged on the circumference at a distance of 150 mm between the center line vertical to the second substrate (1) and the evaporation source (63b) and there was not used the single evaporation source crucible (63c) which was disposed near the bottom within the vacuum vessel and on the center of a circle centered on a center line vertical to the second substrate (1).

Apparatus 106:

Apparatus 106 was prepared in the same manner as the apparatus 101, except that there were not used eight evaporation source crucibles (63a) which were arranged near the bottom surface and on the circumference of a circle centered on a center line vertical to the support and there were not used four evaporation source crucibles (63b) which were arranged on the circumference at a distance of 150 mm between the center line vertical to the second substrate (1) and the evaporation source (63b).

Apparatus 107:

Apparatus 107 was prepared in the same manner as the apparatus 106, except that a phosphor raw material (CsI:5.0 mol % Tl) was used as an evaporation material and the phosphor layer thickness was changed to 650 μm.

Apparatus 108:

Apparatus 108 was prepared in the same manner as the apparatus 101, except that the arrangement region of the first glass substrate 9 was changed, as shown in Table 1.

Apparatus 109:

Apparatus 109 was prepared in the same manner as the apparatus 101, except that the arrangement region of the photoelectric conversion element layer 20b was changed, as shown in Table 1.

Apparatus 110:

Apparatus 110 was prepared in the same manner as the apparatus 101, except, after completing evaporation, the scintillator plate (10A) which formed the scintillator layer 5 was cut to a square form of 430.0 mm×430.0 mm and sealed with a protective film in the same manner as the apparatus 101 (provided that the apparatus 110 was different from the apparatuses 101 to 109 in the first glass substrate 9 being not used).

Evaluation

Definition of Coefficient of Variation of Filling Factor:

A coefficient of variation of filling factor is a characteristic value indicating an extent of dispersion of filling factor of a phosphor within the scintillator layer 5. The coefficient of variation of filling factor is determined in the manner that that the scintillator panel 10 is vertically and horizontally divided to 10 portions and the thus divided 100 areas are each measured with respect to filling factor, and an average filling factor ($D_{av}$) and a standard deviation of filling factor ($D_{dev}$) are determined from filling factors in the individual measurement areas and the coefficient of variation of filling factor which is expressed in percentage is calculated according to the following equation:

$$\text{Coefficient of variation of filling factor} = D_{dev}/D_{av} \ (\%)$$

when $D_{dev}$ is a standard deviation of filing factor and $D_{av}$ is an average filling factor.

Evaluation of Image Defect:

The number of image defects which were generated by setting of scintillator panel was measured from the output data of 12 bit. Herein, the image defect refers to an image element indicating a signal of not more than 90% or not less than 110%. The number of image defects was determined from measurement of the number of defects per 500 pixel× 500 pixel.

Evaluation of Sharpness:

Similarly to the foregoing evaluation of graininess, the FPD was exposed to X-rays at a tube voltage of 80 kVp through a lead MTF chart and the image data was recorded on a hard disc. Then, the record on the hard disc was analyzed by a computer to determine a modulation transfer function, MTF [MTF value (%) at a spatial frequency cycle of 1/mm], which was a measure of sharpness. A higher MTF value indicates superior sharpness. "MTF" is the abbreviation for Modulation Transfer Function. Sharpness (MTF value) is represented by a relative value, based on the sharpness of apparatus 101 being 100.

Evaluation of Luminance:

Samples were each exposed to X-rays at a voltage of 80 kVp from the back surface (not forming a scintillator layer and the image data were detected by the FDP disposed with the scintillator, and the average signal value of the image was defined as emission luminance The luminance was represented by a relative value, based on the luminance of apparatus 101 being 100.

Evaluation of Breakage of Sealing Film in Sealing:

Occurrence of breakage of a sealing film at the time of sealing was visually evaluated and the results are shown in Table 1, in which no occurrence of breakage of a sealing film was denoted by "No" and occurrence of breakage was denoted as "Yes".

51: Imaging panel
52: Control section
53: Memory section
54: Power source section
61: Vapor deposition device
62: Vacuum vessel
63, 63a, 63b, 63c: Evaporation source (member to be filled)
64: Substrate holder
65: Substrate rotation mechanism
66: Vacuum pump
67: Support rotation shaft
68: Shielding plate (shutter)
100: Radiation detector

TABLE 1

| Apparatus No. | Arrangement Region of Glass Substrate (mm) | Arrangement Region of Scintillator Layer (mm) | Arrangement Region of Photoelectric Conversion Element (mm) | Thickness of Scintillator Layer (μm) | Coefficient of Variation of Filling Factor (%) | Luminance (Relative Value) | Sharpness (Relative value) | Number of Image Defects | Breakage of Sealing Film in Sealing | Remark |
|---|---|---|---|---|---|---|---|---|---|---|
| 101 | 429.0 × 429.0 | 430.0 × 430.0 | 428.0 × 428.0 | 470 | 4 | 100 | 100 | 0 | No | Inv. |
| 102 | 429.0 × 429.0 | 430.0 × 430.0 | 428.0 × 428.0 | 170 | 4 | 99 | 101 | 0 | No | Inv. |
| 103 | 429.0 × 429.0 | 430.0 × 430.0 | 428.0 × 428.0 | 580 | 4 | 100 | 99 | 0 | No | Inv. |
| 104 | 429.0 × 429.0 | 430.0 × 430.0 | 428.0 × 428.0 | 470 | 9 | 99 | 99 | 2 | No | Inv. |
| 105 | 429.0 × 429.0 | 430.0 × 430.0 | 428.0 × 428.0 | 470 | 20 | 99 | 98 | 5 | No | Inv. |
| 106 | 429.0 × 429.0 | 430.0 × 430.0 | 428.0 × 428.0 | 470 | 25 | 97 | 94 | 32 | No | Comp. |
| 107 | 429.0 × 429.0 | 430.0 × 430.0 | 428.0 × 428.0 | 650 | 27 | 96 | 83 | 35 | No | Comp. |
| 108 | 435.0 × 435.0 | 430.0 × 430.0 | 428.0 × 428.0 | 470 | 4 | 99 | 97 | 8 | Yes | Comp. |
| 109 | 429.0 × 429.0 | 430.0 × 430.0 | 430.0 × 430.0 | 470 | 4 | 96 | 94 | 27 | No | Comp. |
| 110 | — | 430.0 × 430.0 | 428.0 × 428.0 | 470 | 4 | 98 | 96 | 56 | No | Comp. |

As is apparent from Table, it was proved that radiation detectors of the present invention were each compact, caused no image defect and were superior in prevention of breakage of sealing film.

A panel (10) in which only a scintillator plate (10A) and a first substrate (9) were enclosed with film to be moisture-resistant was also feasible, leading to superior moisture resistance and durability. However, as described in Examples, a scintillator panel (10) in which a moisture-absorbing layer (7) was also enclosed with a moisture-resistant protective layer was more preferable.

DESCRIPTION OF NUMERAL

1: Second substrate
2: Intermediate layer
3: Reflection layer
4: Protective layer
5: Scintillator layer
6: Moisture-resistant layer
6a, 6b: Sealing film
7: Moisture absorbing layer
8A: First adhesive layer
8B: Second adhesive layer
9: First substrate
10: Scintillator panel
10A: Scintillator plate
20: Output substrate
20a: Diaphragm of output substrate
20b: Photoelectric conversion element layer
21: Transparent electrode
22: Charge generation layer
23: Counter electrode
20c: Output layer
20d: Third substrate

What is claimed is:

1. A radiation detector comprising£ a first radiation-transmissive substrate, a first adhesive layer, a second radiation-transmissive substrate, a scintillator layer and an output substrate provided with a photoelectric conversion element layer which are provided sequentially in this order, wherein an arrangement region of the scintillator layer in a planar direction of the layer includes an arrangement region of the photoelectric conversion element layer in a planar direction of the layer and an arrangement region of the first substrate in a planar direction of the substrate, and the arrangement region of the first substrate includes the arrangement region of the photoelectric conversion element layer; and wherein when the arrangement region of the scintillator layer is divided to plural areas, a coefficient of variation of filling factor is 20% or less which is defined as a standard deviation of filling factor of phosphor of the plural areas, divided by an average value of the filling factor.

2. The radiation detector as claimed in claim 1, wherein an arrangement region of the first adhesive layer in a planar direction of the layer is included within the arrangement region of the scintillator layer in the planar direction and includes the arrangement region of the first substrate in the planar direction of the substrate.

3. The radiation detector as claimed in claim 2, wherein a second adhesive layer and a moisture absorbing layer are provided sequentially in this order on an opposite side of the first substrate to the scintillator layer.

4. The radiation detector as claimed in claim 2, wherein a moisture-resistant protective layer is provided between the scintillator layer and the output substrate provided with the photoelectric conversion element layer.

5. The radiation detector as claimed in claim 2, wherein the scintillator layer comprises a cesium halide phosphor.

6. The radiation detector as claimed in claim 1, wherein a second adhesive layer and a moisture absorbing layer are provided sequentially in this order on an opposite side of the first substrate to the scintillator layer.

7. The radiation detector as claimed in claim 6, wherein the first substrate, the first adhesive layer, the second substrate, the scintillator layer, the second adhesive layer and the moisture-absorbing layer are enveloped by a moisture-resistant protective layer.

8. The radiation detector as claimed in claim 7, herein the scintillator layer is formed by a process of gas phase deposition.

9. The radiation detector as claimed in claim 6, wherein the scintillator layer comprises a cesium halide phosphor.

10. The radiation detector as claimed in claim 6, wherein a moisture-resistant protective layer is provided between the scintillator layer and the output substrate provided with the photoelectric conversion element layer.

11. The radiation detector as claimed in claim 2, wherein the first substrate, the first adhesive layer, the second substrate and the scintillator layer are enveloped by a moisture-resistant protective layer.

12. The radiation detector as claimed in claim 2, wherein the scintillator layer is formed by a process of gas phase deposition.

13. The radiation detector as claimed in claim 6, wherein the scintillator layer is formed by a process of gas phase deposition.

14. The radiation detector as claimed in claim 1, wherein a moisture-resistant protective layer is provided between the scintillator layer and the output substrate provided with the photoelectric conversion element layer.

15. The radiation detector as claimed in claim 14, wherein the scintillator layer is formed by a process of gas phase deposition.

16. The radiation detector as claimed in claim 1, wherein the first substrate, the first adhesive layer, the second substrate and the scintillator layer are enveloped by a moisture-resistant protective layer.

17. The radiation detector as claimed in claim 16, herein the scintillator layer is formed by a process of gas phase deposition.

18. The radiation detector as claimed in claim 1, wherein the scintillator layer is formed by a process of gas phase deposition.

19. The radiation detector as claimed in claim 1, wherein the scintillator layer comprises a cesium halide phosphor.

20. The radiation detector as claimed in claim 1, wherein the scintillator layer contains thallium as an activator.

* * * * *